ISO008160932B2

United States Patent
Shii

(10) Patent No.: US 8,160,932 B2
(45) Date of Patent: Apr. 17, 2012

(54) ARTWORK-TRADING SYSTEM AND ARTWORK-TRADING PROGRAM FOR TRADING ARTWORKS CREATED BY ARTIST OVER NETWORK

(75) Inventor: Taihei Shii, Funabashi (JP)

(73) Assignee: Taihei Shii, Funabashi-Shi (JP)

( * ) Notice: Subject to any disclaimer, the term of this patent is extended or adjusted under 35 U.S.C. 154(b) by 0 days.

(21) Appl. No.: 12/669,898

(22) Filed: Jan. 20, 2010

(65) Prior Publication Data

US 2010/0223156 A1    Sep. 2, 2010

Related U.S. Application Data

(63) Continuation of application No. PCT/JP2008/062215, filed on Jul. 4, 2008.

(30) Foreign Application Priority Data

Jul. 23, 2007  (JP) ................................. 2007-190656
Jun. 23, 2008  (JP) ................................. 2008-163676

(51) Int. Cl.
   *G06Q 30/00*    (2006.01)
(52) U.S. Cl. ...................................... 705/26.3; 705/27.1
(58) Field of Classification Search ............... 705/26–27
   See application file for complete search history.

(56) References Cited

U.S. PATENT DOCUMENTS

| | | | | |
|---|---|---|---|---|
| 3,581,072 A * | 5/1971 | Nymeyer | ......................... | 705/37 |
| 5,835,896 A * | 11/1998 | Fisher et al. | ..................... | 705/37 |
| 6,343,273 B1 * | 1/2002 | Nahan et al. | ....................... | 705/5 |
| 6,606,608 B1 * | 8/2003 | Bezos et al. | ................. | 705/36 R |
| 6,609,112 B1 * | 8/2003 | Boarman et al. | ................. | 705/37 |
| 6,813,612 B1 * | 11/2004 | Rabenold et al. | ................ | 705/37 |
| 6,963,856 B2 * | 11/2005 | Lutnick et al. | ................... | 705/37 |
| 7,356,508 B2 * | 4/2008 | Pellegrini | ......................... | 705/41 |
| 2004/0254804 A1 * | 12/2004 | Peterffy et al. | .................... | 705/1 |
| 2006/0010075 A1 * | 1/2006 | Wolf | ............................... | 705/57 |
| 2006/0167710 A1 * | 7/2006 | King et al. | .......................... | 705/1 |
| 2007/0185794 A1 * | 8/2007 | Keiser et al. | .................... | 705/35 |
| 2007/0198426 A1 * | 8/2007 | Yates | .............................. | 705/59 |
| 2008/0306836 A1 * | 12/2008 | West | ............................... | 705/26 |

(Continued)

FOREIGN PATENT DOCUMENTS

JP    2002-157313 A1    5/2002

(Continued)

OTHER PUBLICATIONS

"Why Has IPO Underpricing Changed Over Time?" (Loughran, Tim and Ritter, Jay, Financial Management, Autumn 2004, pp. 5-37).*

(Continued)

*Primary Examiner* — Adam Levine
*Assistant Examiner* — Ethan D Civan
(74) *Attorney, Agent, or Firm* — Kratz, Quintos & Hanson, LLP

(57) ABSTRACT

An artwork-trading computer system includes a primary auction for trading an artwork put up by an artist for the first time and a secondary auction for the following reselling. A server judges whether a bidding is for the primary auction or the secondary auction. When the server judges it as the primary auction, the server sends the artist a signal for requesting to select a winning bidder among the bidding collectors. Meanwhile, when the server judges it as the secondary auction, the server decides the winning bidder who offers the best bid price.

11 Claims, 14 Drawing Sheets

U.S. PATENT DOCUMENTS

| | | | |
|---|---|---|---|
| 2009/0216680 A1* | 8/2009 | McCown et al. | 705/75 |
| 2009/0281908 A1* | 11/2009 | Wong | 705/26 |

FOREIGN PATENT DOCUMENTS

| | | |
|---|---|---|
| JP | 2002-251570 A1 | 9/2002 |
| JP | 2004-199396 A1 | 7/2004 |
| JP | 2006-4362 A1 | 1/2006 |

OTHER PUBLICATIONS

"Employee Sentiment and Stock Option Compensation" (Bergman, Nittai and Jenter, Dirk, Journal of Financial Economics, Jun. 2007, vol. 84, issue 3, pp. 667-712).*

"Whose Fault is it Anyway?" (Nayak, Mahesh and Gopalan, Krishna, Business Today, Dec. 18, 2005, p. 104).*

"Christie's Live Brings the Floor Online" (Pollock, Lindsay, International Herald Tribune, Jul. 13, 2006, p. 14).*

"Brothers of Invention" (Kirby, Jason, National Post, Nov. 5, 2006, p. FW6).*

"Sotheby's Online Virtually Bought and Sold" (Altabe, Joan, Sarasota Herald Tribune, Dec. 19, 1999, p. 1G).*

International Search Report for International Application No. PCT/JP2008/062215 dated Jul. 24, 2008.

* cited by examiner

ARTWORK-TRADING SYSTEM AND ARTWORK-TRADING PROGRAM FOR TRADING ARTWORKS CREATED BY ARTIST OVER NETWORK

CROSS-REFERENCE TO RELATED APPLICATION

This application is a continuation of prior International Patent Application No. PCT/JP2008/062215, filed Jul. 4, 2008, the entire contents of which are incorporated herein by reference.

BACKGROUND OF THE INVENTION

1. Field of the Invention

The present invention relates to an artwork-trading system and an artwork-trading program for trading artworks created by an artist over a network such as the Internet.

2. Description of the Related Art

Though many new artists come into the world and many new artworks are created every year, their artworks are hardly seen at art galleries.

The reason is that it is a high-risk business for the galleries to handle the artworks of unvalued artists. Accordingly, those artworks are not exhibited unless the artists are quite favorably disposed by the galleries.

Incidentally, Japanese Patent Laid-open No. 2002-251570 releases a system which exhibits artworks of artists on the Internet and trades them by auction. Under the system, the artworks are evaluated whether they satisfy a certain conditions before they are exhibited on the Internet, and only the satisfied artworks are exhibited on the Internet with a reference.

As described above, even if the artworks of the artists are exhibited, either in galleries or at the auction site on the Internet appeared at Japanese Patent Laid-open No. 2002-251570, only the selected artworks are exhibited. Therefore, in the present circumstances, many unchosen artworks, particularly those of new artists, are becoming extinct without being evaluated in the marketplace.

SUMMARY OF THE INVENTION

It is an object of the present invention to provide an artwork-trading system and an artwork-trading program which enable to enhance a creative motivation of an artist and activate an artwork market by making it possible for many people to see and evaluate artworks, by making it possible for the artworks to be traded at a fair price, and by giving an artist a reasonable share of a trade price.

One aspect of the artwork-trading computer system includes a server which sets a bidding period and performs an auction for an artwork, an artist terminal which sends an visual data of the artwork to the server, and a collector terminal which sends bidding data of the artwork to the server, wherein the auction includes a primary auction for an artwork which is put up for the first time from the artist terminal and a secondary auction for an artwork which is put up for a resale purpose, and the server sends the artist terminal a signal for requesting to select a winning bidder among bidding collectors when the server judges the artwork is put up for the primary auction, or the server decides a winning bidder who offers a best bid price when the server judges the artwork is put up for the secondary auction.

This system can lead to the following advantages.

(1) The entire auction can be facilitated since the primary auction and the secondary auction are performed in the same system.

(2) The server can judge between the primary auction and the secondary auction promptly. When the server judges it as the primary auction, the artist is given a right to select a winning bidder.

This way, as the system enables the artist to participate in an auction business, the creative motivation of the artist is enhanced.

When the server judges it as the secondary auction, a prompt trade is possible, because a best bit price presenter is decided automatically as a winning bidder.

(3) Regarding a method of deciding a winning bidder, the artist is given a right to select a winning bidder at the primary auction, and the participation of the artist is excluded at the secondary auction. Therefore, it is possible to activate the auction while enhancing the creative motivation of the artist.

DESCRIPTION OF THE PREFERRED EMBODIMENTS

Figure 1:
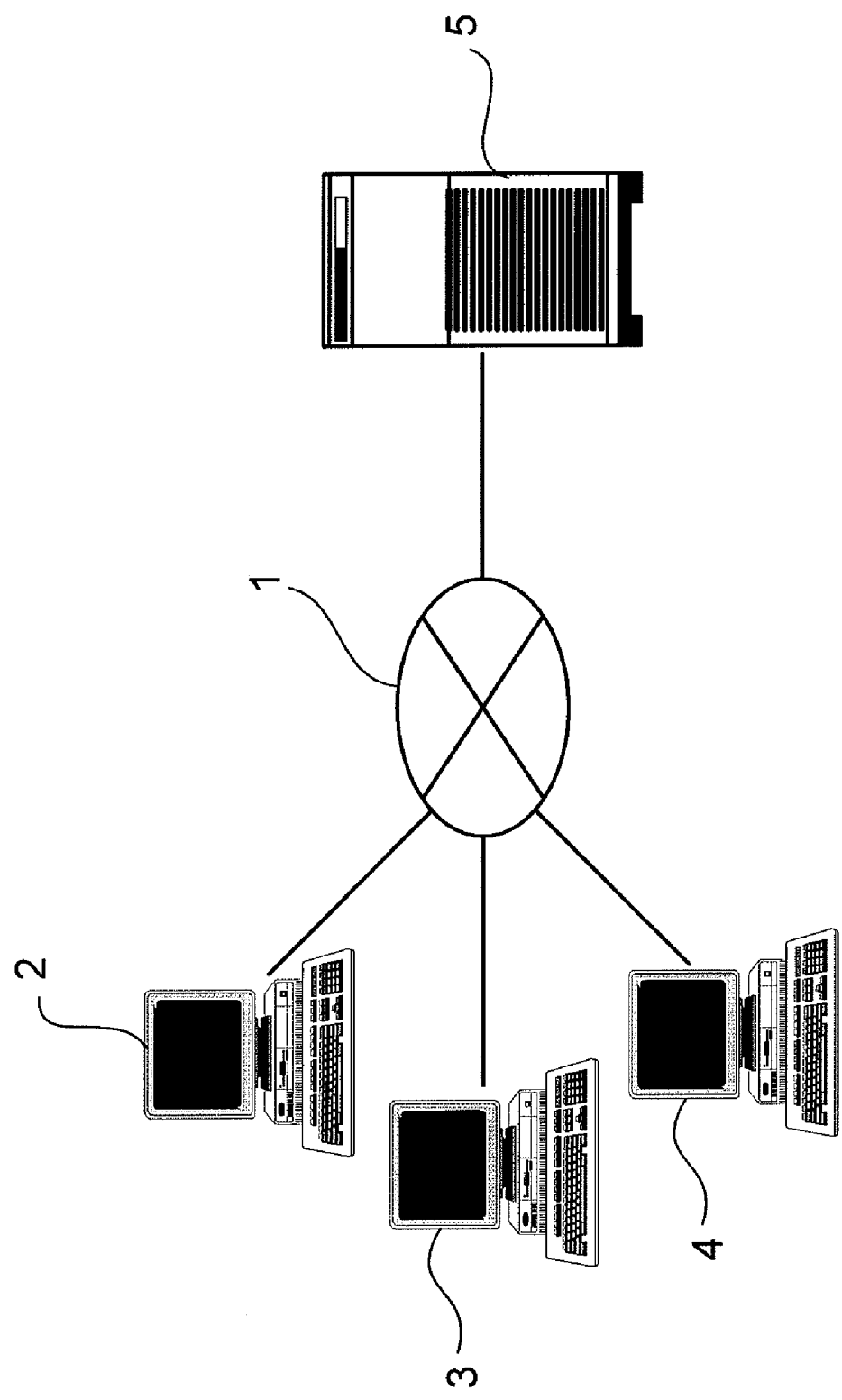
FIG. 1 is a view illustrating an entire constitution of a system according to the present invention.

In the following, description will be made for the embodiment of the present invention referring to the drawings.

(1) Constitution of an Entire System

This system uses networks such as the Internet 1. As illustrated in FIG. 1, an artist terminal 2, a reviewer terminal 3, a collector terminal 4, and a server 5 of an administrator are connected to the Internet 1.

Here, the artist means a person who creates some kind of artworks, including a painter, a sculptor, a calligrapher, a contemporary art creator, and a highly creative performer.

The reviewer means a person in general who releases some comments on artworks, including a commentator, a critic, and a writer. The collector means a buyer in general, including a person who specially collects artworks, an investor, and an art dealer. The administrator means a person who administrates and manages the entire system. Further, a user includes an artist, a reviewer, and a collector.

(2) Outline of the User Registration Procedures and Access

Figure 2:
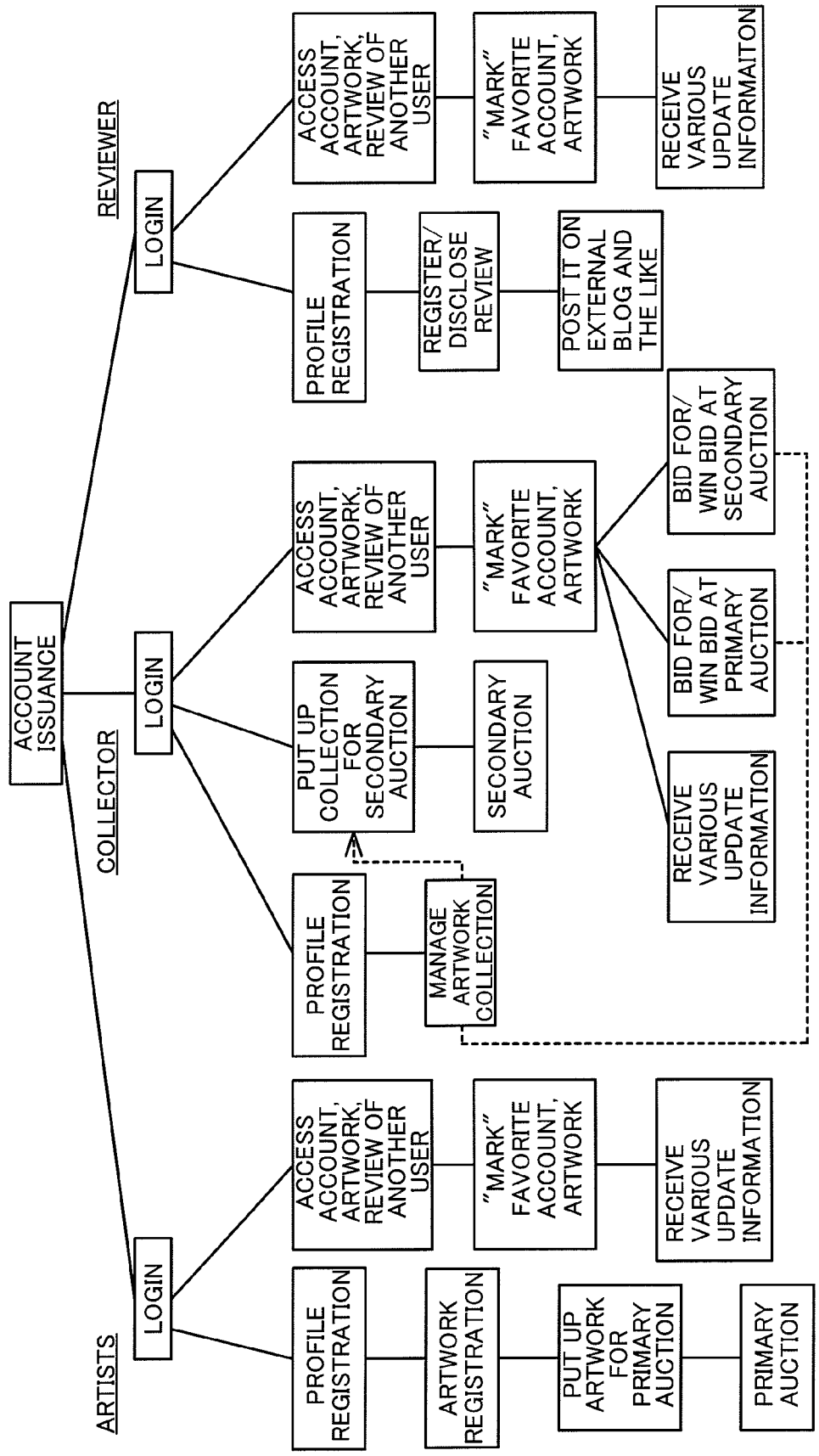
FIG. 2 is a view illustrating user-to-server registration procedures and processing operation.

FIG. 2 is a tree-structured view illustrating procedures to register in the server and processes on the system for each user account. The user can become a member of this system through the account registration procedures. Then, after acquiring a membership, the user can register his/her profile. Further, various processes can be performed according to kinds of the users. In the following, a detailed description will be made.

<Account Registration Procedures>

Figure 3:
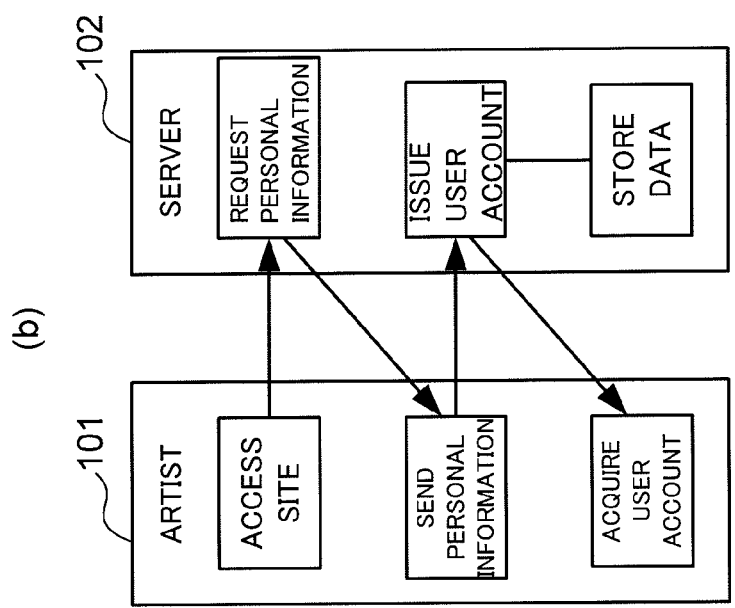
FIG. 3A and FIG. 3B are views illustrating account registration procedures for a user.
Figure 3:
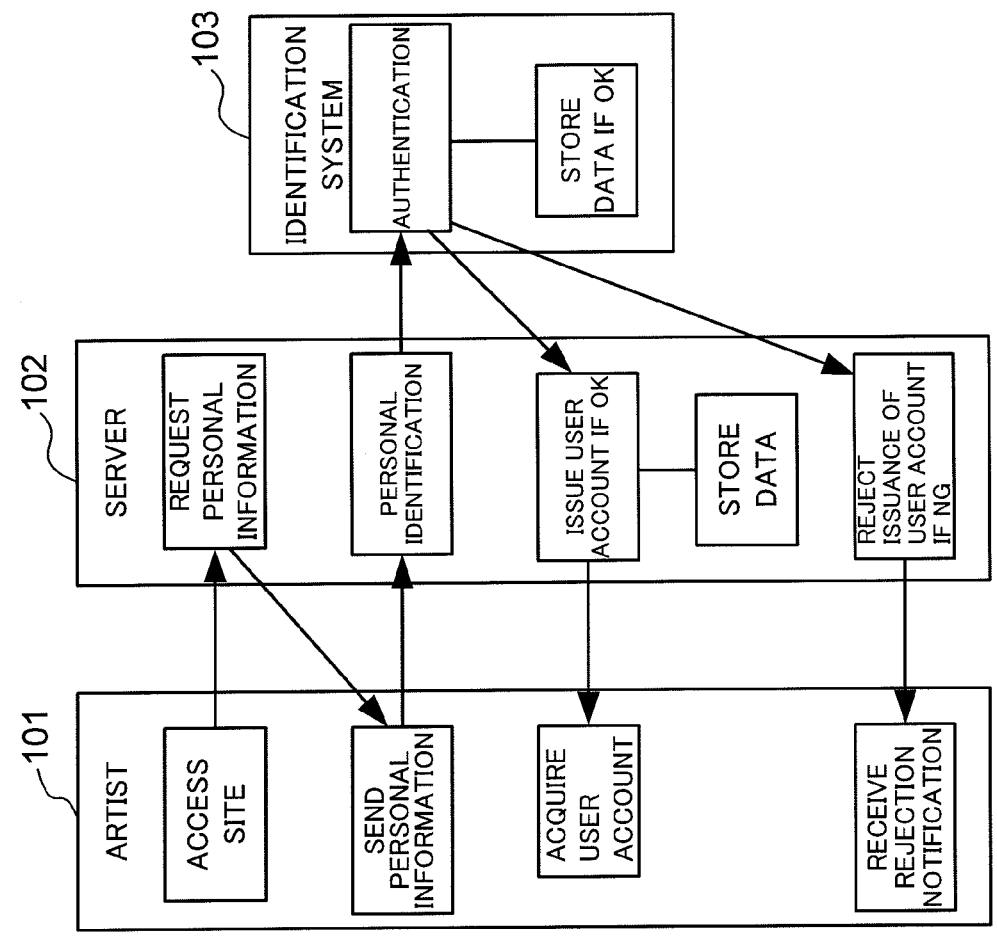

FIG. 3A is a flow chart illustrating the account registration procedures when an external identification system identifies a user. When an artist desires the issuance of the artist account and accesses a server 102 of an administrator from an artist terminal 101, the server 102 confirms if he/she has an invitation from another registered user. After confirmation of the invitation, the server 102 requests to send a personal information (e-mail address, password and the like) of the artist. When the artist terminal 101 sends his/her personal information to the server 102 in response, the server 102 inquires the external identification system 103 whether the artist is appropriate. When the identification by the identification system 103 is rejected, the issuance of the account will be refused. When the appropriateness of the artist is certified, the server 102 issues the account for the artist and sends it to the artist terminal 101. Simultaneously, the server 102 registers the issued account information of the artist to a storage device of the server 102 with the personal information of the artist.

FIG. 3B is a view illustrating a flow of the account registration procedures when personal identification by the external identification system is not performed. As illustrated in FIG. 3B, the flow of the procedures is the same as that of FIG. 3A except the omission of the personal identification procedure by the external identification system.

The account registration is a required procedure also for a reviewer and a collector. The registration procedures are basically same as those of the account registration for the artist. Further, in case of the account registration of the collector, it is possible for him/her to register without an invitation from another registered user. Instead, the collector is required to input his/her credit card information and the like.

(3) Functions that the User Obtains Upon Acquisition of the Account

<Registration of a Profile>

Figure 4:
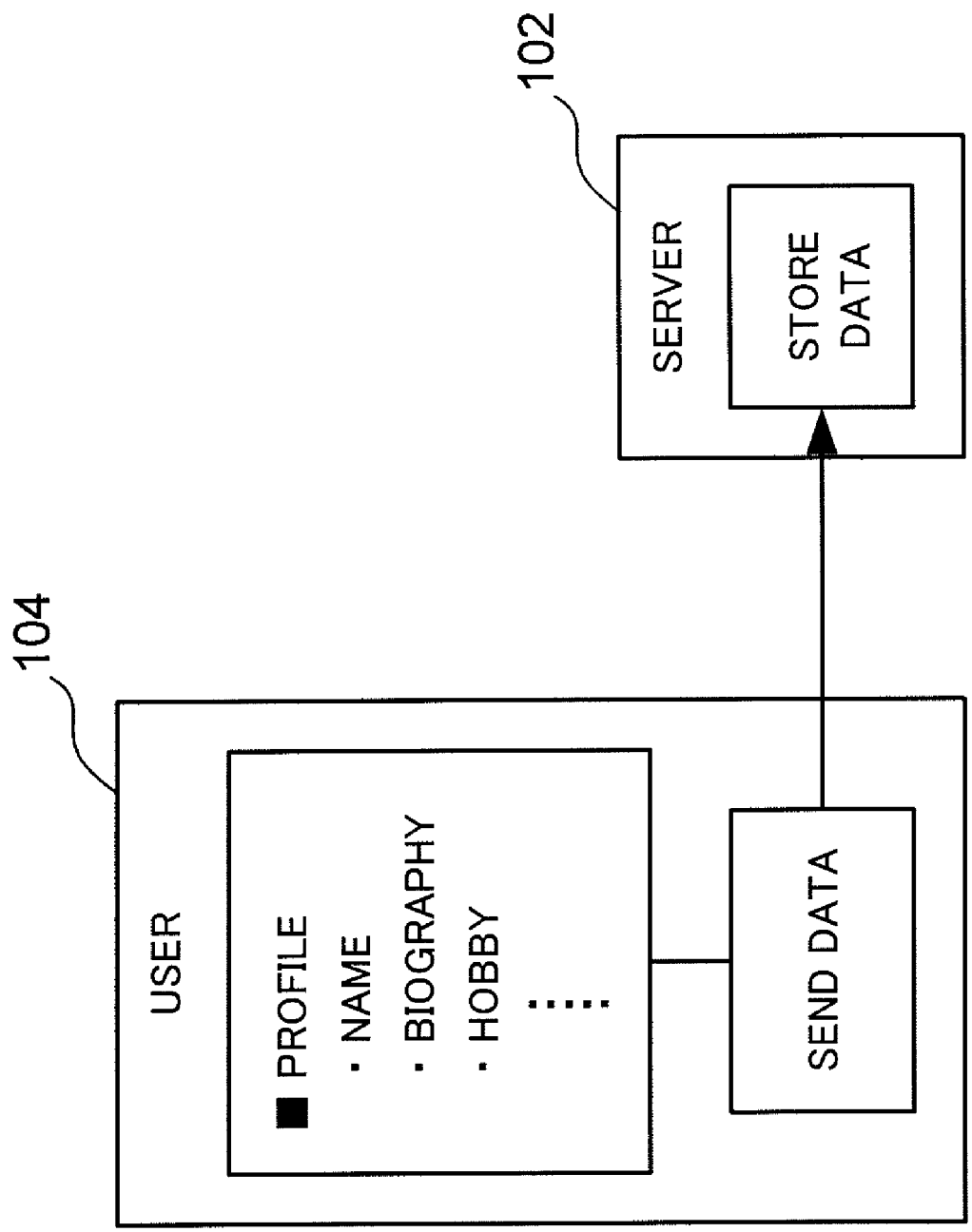
FIG. 4 is a view illustrating profile registration procedures for a user.

When the account is issued, as illustrated in FIG. 4, the user can login to a user terminal 104 and register his/her "profile" to the storage device of the server 102. In the profile, in addition to his/her name, his/her personal history, hobbies and the like are posted. For example, the artist can exhibit his/her artworks and release his/her award winning history, for example. The reviewer can release his/her comments on artworks, and the collector can release his/her art collection. This way, the user can introduce himself/herself and make an appeal by registration of his/her profile.

<Registration of Artworks Created by the Artist and the Like>

Figure 5:
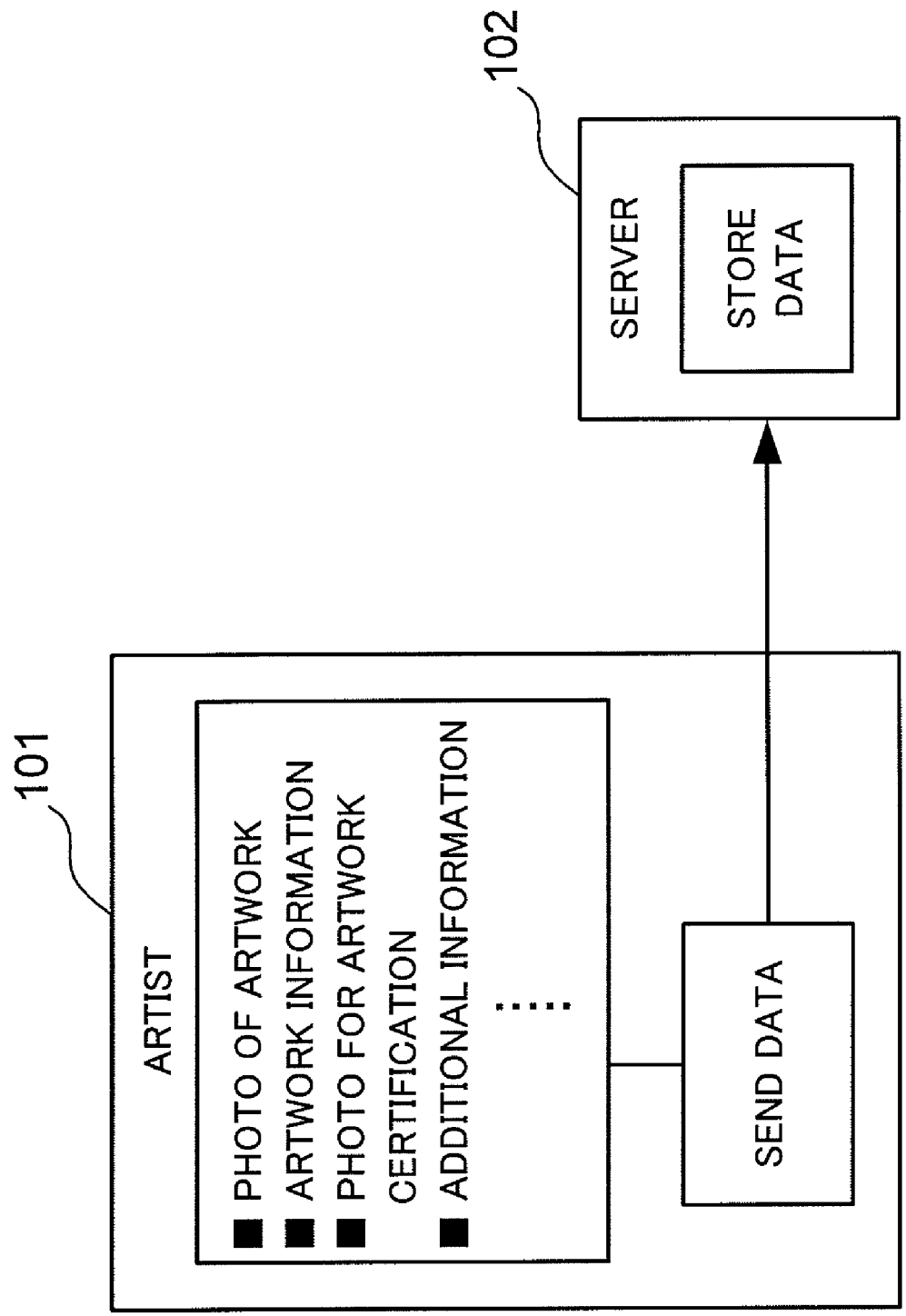
FIG. 5 is a view illustrating artwork registration procedures for an artist.

As illustrated in FIG. 5, the artist can release his/her artwork data (photos of artworks, information on artworks, photos for artwork certification, additional information and the like) on the system through registering them from the artist terminal 101 to the server 102.

Further, the artist can put up his/her artworks at the primary auction and administer his/her artworks on the system as well as register event information and the like and disclose it on the system.

<Registration of a Reviewer's Comment on Artworks and the Like>

Figure 6:
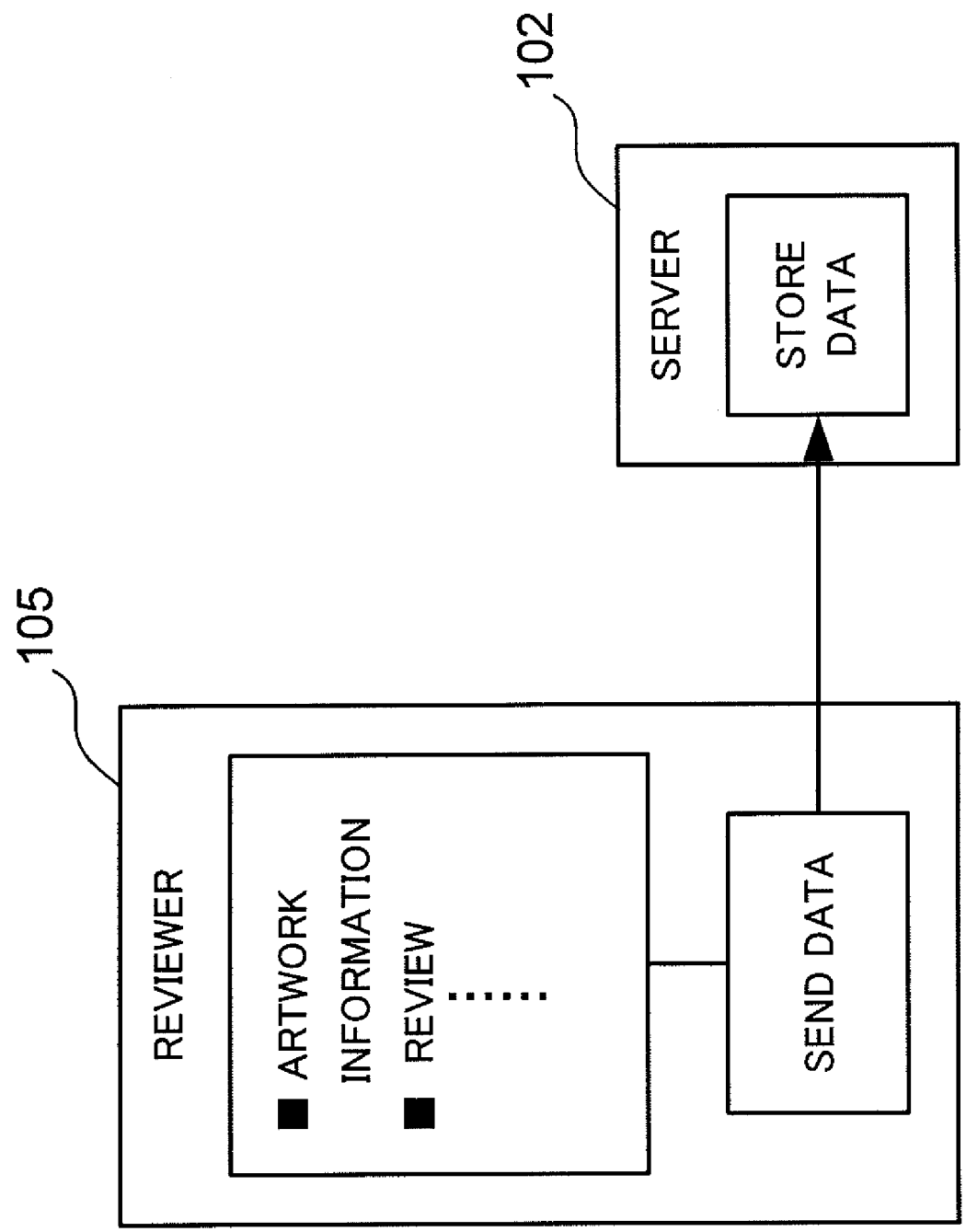
FIG. 6 is a view illustrating review registration procedures for an artwork of a reviewer.

As illustrated in FIG. 6, the reviewer can release his/her comments and reviews on the artist's artworks by registering them from the reviewer terminal 105 to the server 102, and releases them on the system. Further, the registered review articles can be posted on an external blog and the like. Accordingly, an advertisement can be performed to a potential user outside of the system.

<Exhibition by a Collector and the Like>

The collector can bid for an artwork put up at the primary auction. Also, he/she can exhibit the artwork, which he/she made a winning bid at the primary auction, at the secondary auction.

<Procedures of Marking>

The user can "mark" all other user's accounts. The user can also "mark" artworks of artists. In the following, the detailed description will be made on each case.

a. Procedures to Mark Another User's Account

The user who acquired the account can "mark" another user's account. This way, once the user marks another user's page information in advance, it is very convenient. Because, update information will be sent to the user in real time when the marked user's page has an addition, a deletion, or a modification later. For example, he/she can avoid missing the information sent from the reviewer he/she marked.

Figure 7:
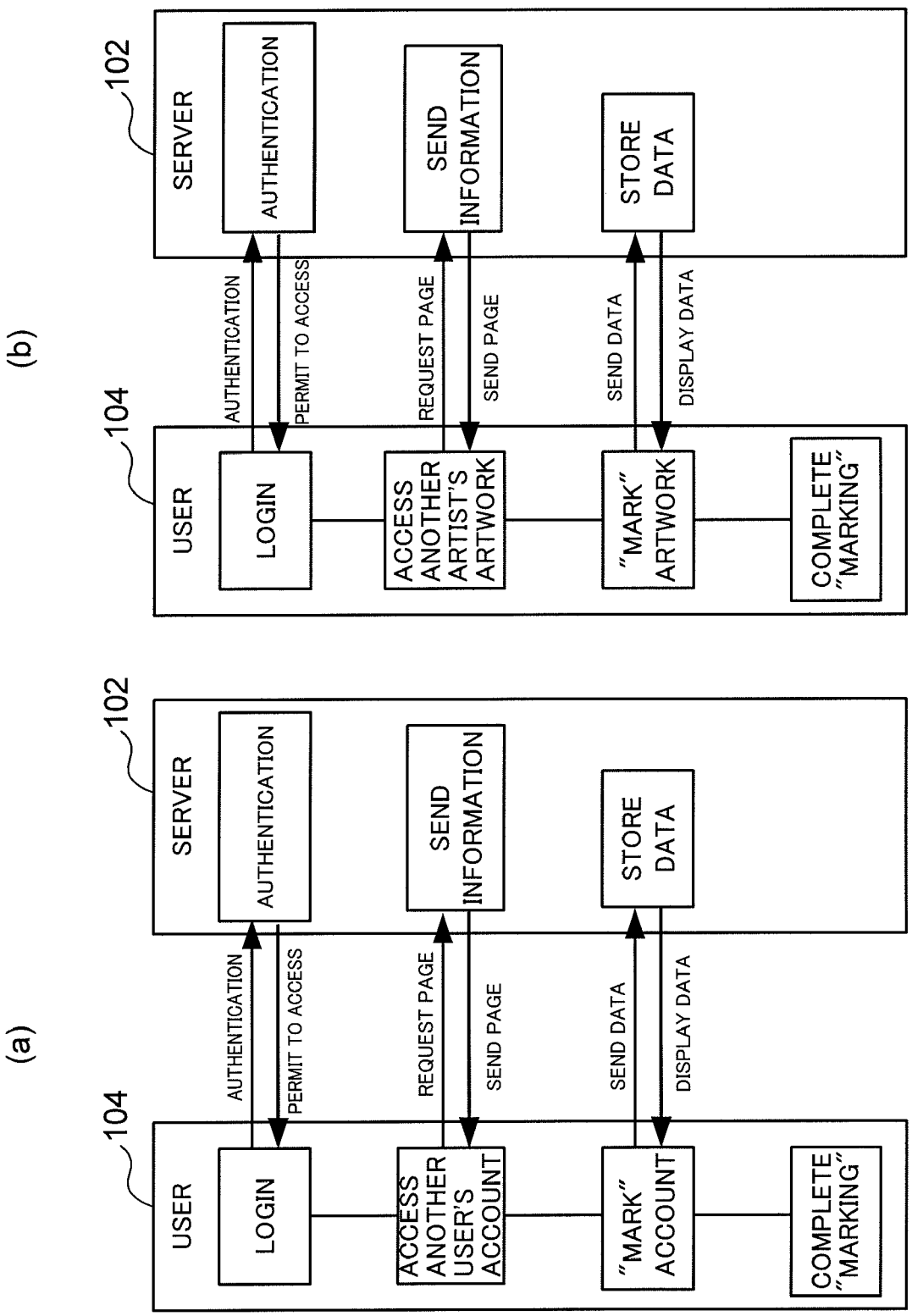
FIG. 7A and FIG. 7B are views illustrating "marking" procedures.

FIG. 7A illustrates a flow of the procedures to mark another user's account.

When the user receives permission to access from the server through the user-login procedures and user identification, the user accesses the account of the objective another user and requests page information of that user. When the page information is sent to the user, he/she sends it back to the server with the marking data, then the marked page information will be stored in the storage device of the server.

b. Marking an Artwork of Another Artist

FIG. 7B illustrates a flow of the procedures to mark an artwork of another artist. Since the procedures of the marking are basically the same as those of "marking" another user's account, as illustrated in FIG. 7A, the description will be omitted.

This way, once a user marks an artwork of an artist, he/she can avoid missing an opportunity to buy the artwork he/she is interested in. Because, update information is sent to the user in real time when the artwork page of the artist has an addition, a deletion, or a modification later.

Also, all information, about who "marks" which account and what artwork, is disclosed on the system. Therefore, when the user's favorite artwork is marked by another account, the user can find other artworks which the account has marked, by accessing the account. Consequently, it enables the user to have more opportunities to encounter an artwork that suits his/her tastes.

Further, the situation where the account or artwork of the user is "marked" by another user is referred to as "MARKED." The more the number of "MARKEDs"

increases, the more a popularity of the artwork and/or the account grows. Therefore, the number of "MARKEDs" represents an index of the popularity.

<Accessing a User's Own Account>

Figure 8:
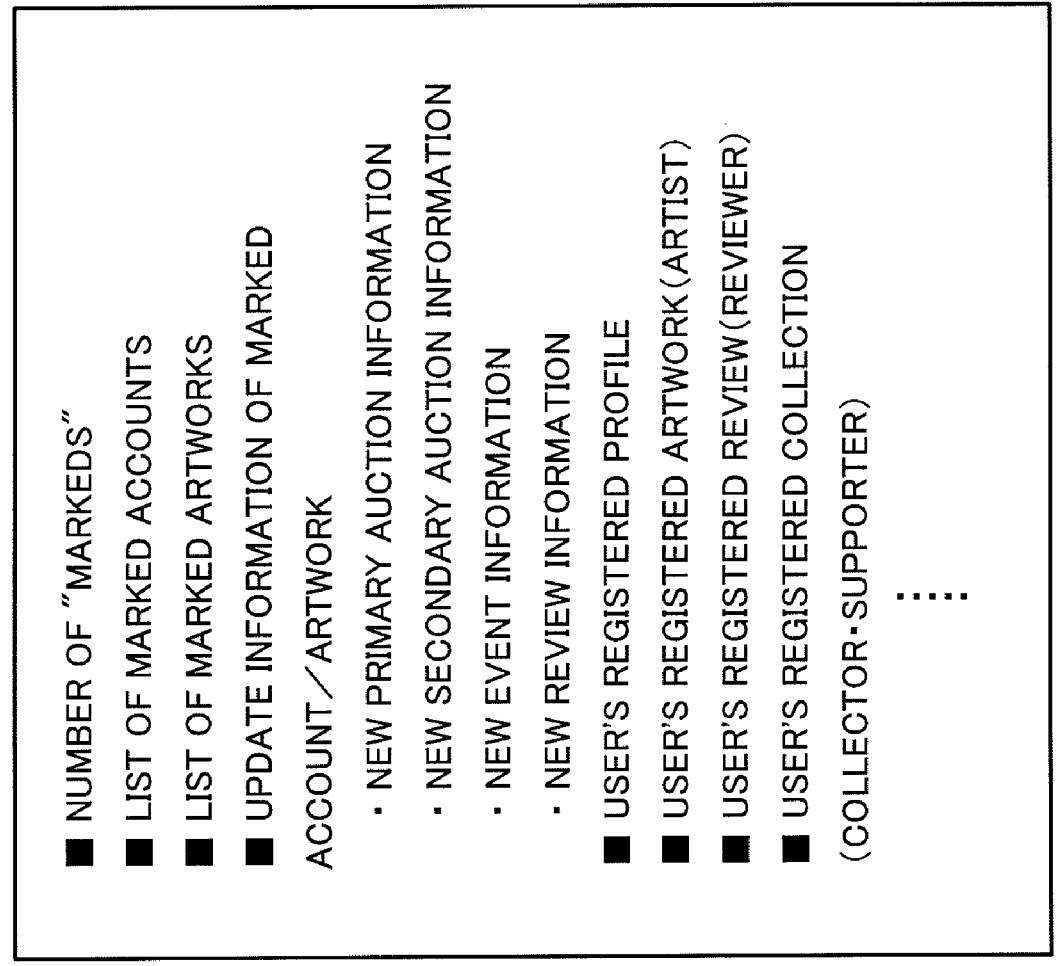
FIG. 8 is a view illustrating indications when a user accesses his/her own account.

FIG. 8 illustrates a list of contents shown on the display screen of an electronic terminal of a user when the user accesses his/her own account. The contents include the number of "MARKEDs" marked by another user, a list of the accounts that he/she has marked, a list of artworks, update information of accounts and/or artworks, the profile which he/she has registered, and the like. In case of an artist, the artist's artworks which he/she has registered are displayed. In case of a reviewer, the reviews which he/she has registered are displayed. In case of a collector, the artwork collection which he/she has collected is displayed.

<Access to Another User's Account>

Figure 9:
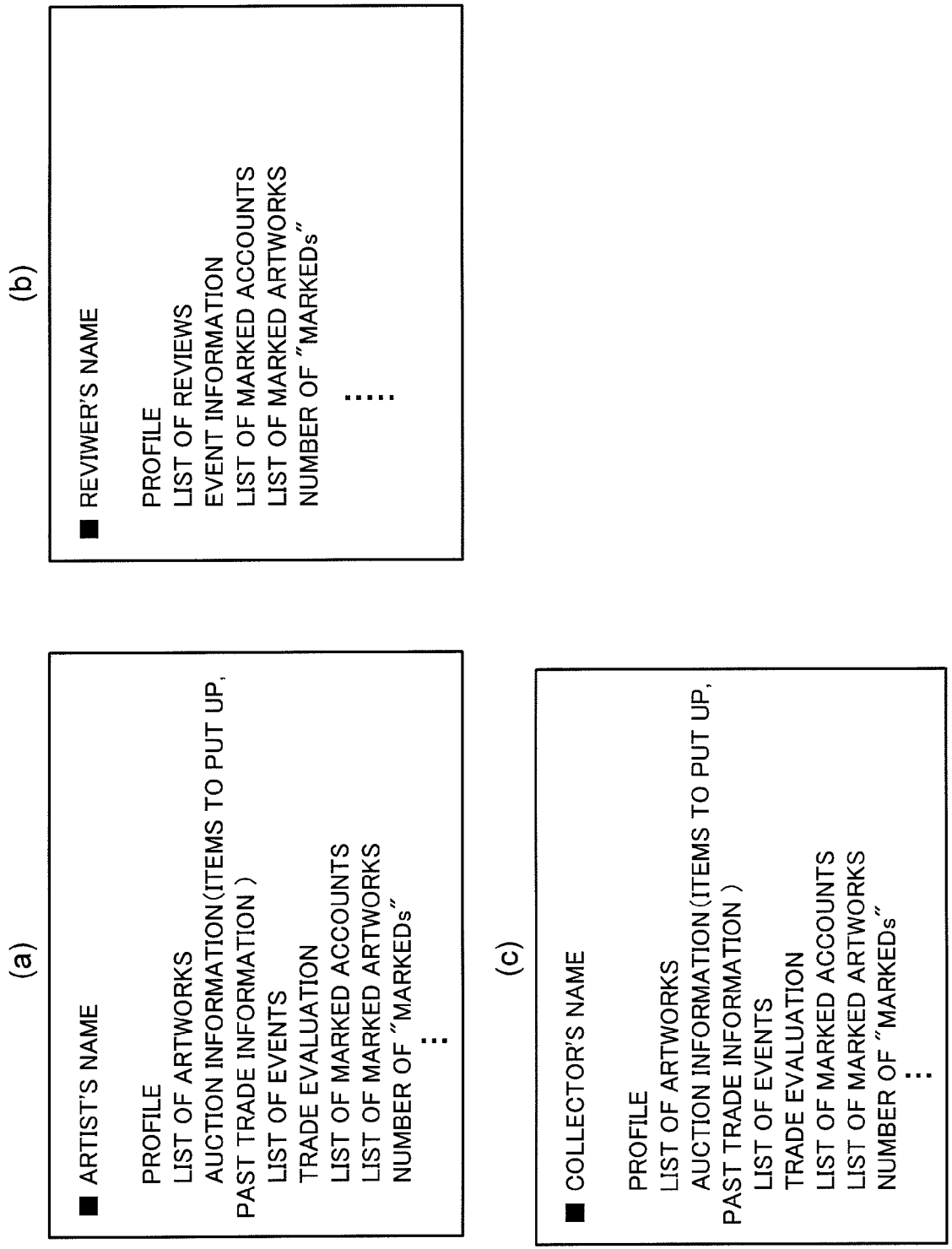
FIGS. 9A through 9C are views illustrating indications when a user accesses an account of another user.

FIG. 9 illustrates the information shown on the display screen of a user electronic terminal when the user accesses another user's account.

FIG. 9A illustrates a case when a user accesses an account of an artist. The information shown on his/her display screen includes the artist's profile, a list of the artist's artworks, auction information (items to be put up for auction, past trade information), a list of the announcements of events such as an exhibition where the artworks of the artist are displayed, trade evaluation, a list of other user's accounts which the artist has marked, moreover, a list of the artworks of another artist which the artist has marked, the number of "MARKEDs," and the like.

Further, FIG. 9B illustrates a case when a user accesses a reviewer's account. The information shown on his/her display screen includes the reviewer's profile, a list of the reviewer's comments, event information, a list of other user's accounts which the reviewer has marked, moreover, a list of the artist's artworks which the reviewer has marked, the number of "MARKEDs," and the like.

Still further, FIG. 9C illustrates the information shown on the display screen of a user terminal when a user accesses a collector's account. The information includes the collector's profile, a list of the collector's artwork collection, auction information (items to be put up for auction, past trade information), a list of event information, trade evaluation, a list of the other user's accounts which the collector has marked, moreover, a list of the artist's artworks which the collector has marked, the number of "MARKEDs," and the like.

This way, once a user "marks" another user's account, it is convenient because update information can be acquired immediately after the user's page information is updated.

Specially, since the important information such as the past records of the artist's artworks, the reviewer's comments, and the collector's winning bids are regularly released, it is possible to promote a fair trade at an auction and activate the auction.

(4) The First Embodiment of the Primary Auction

Figure 10:
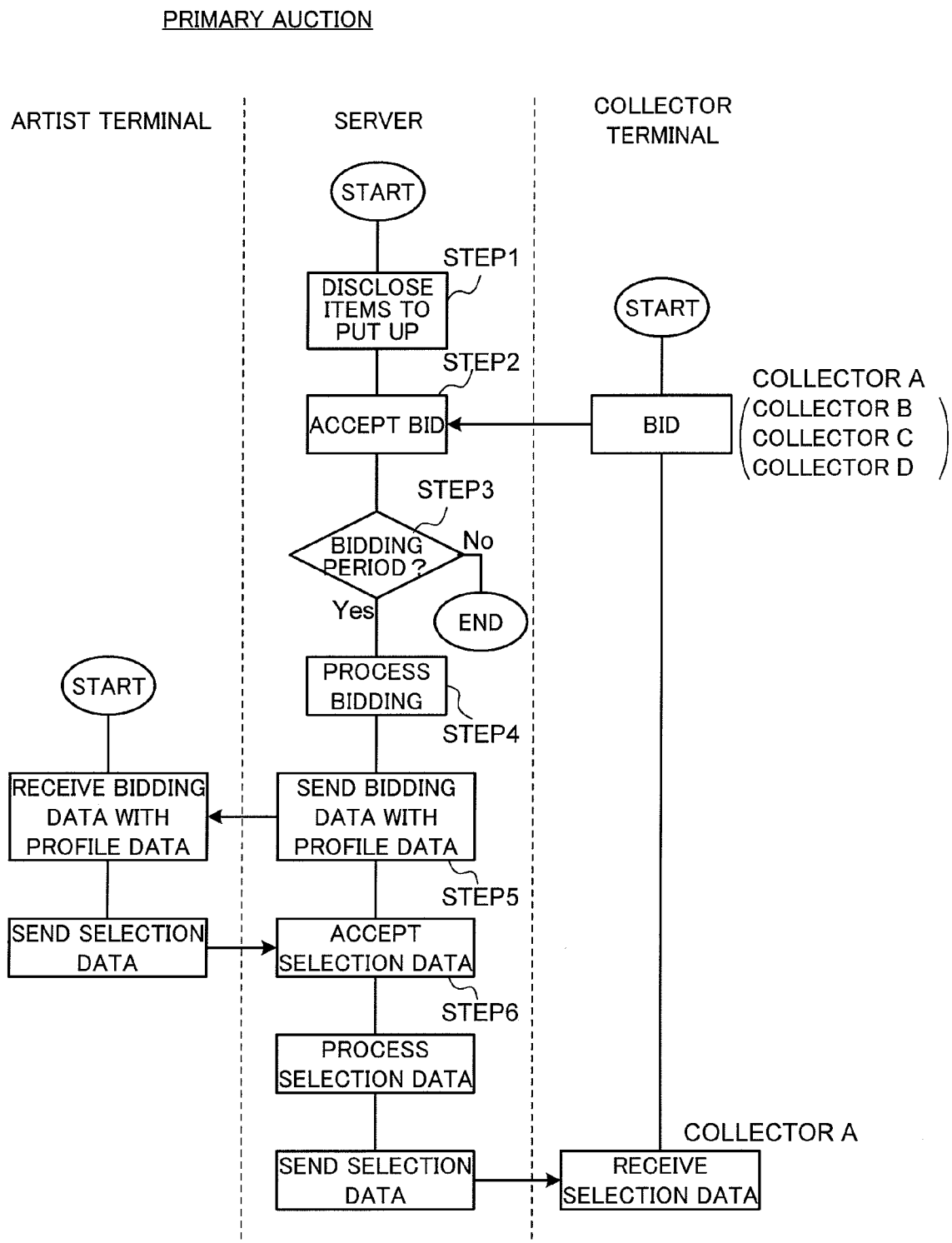
FIG. 10 is a flow chart illustrating processing operation at a primary auction

FIG. 10 is a view illustrating the first embodiment of the primary auction.

The primary auction adopts a closed method, and a bidding situation is not disclosed. Therefore, the information on a bidder and the desired bid price offered by the bidder is not disclosed.

When an artist sends the exhibition data for his/her artwork (artwork information, price information, exhibition information and the like) from the artist terminal 101 to the server 102, the server releases the exhibition data, then the primary auction starts (Step 1).

First, when collector A offers his/her bid, his/her bidding data sent from the collector terminal 103 is accepted by the server 102 (Step 2), and it is judged whether it is sent within the bidding period (Step 3).

Figure 11:
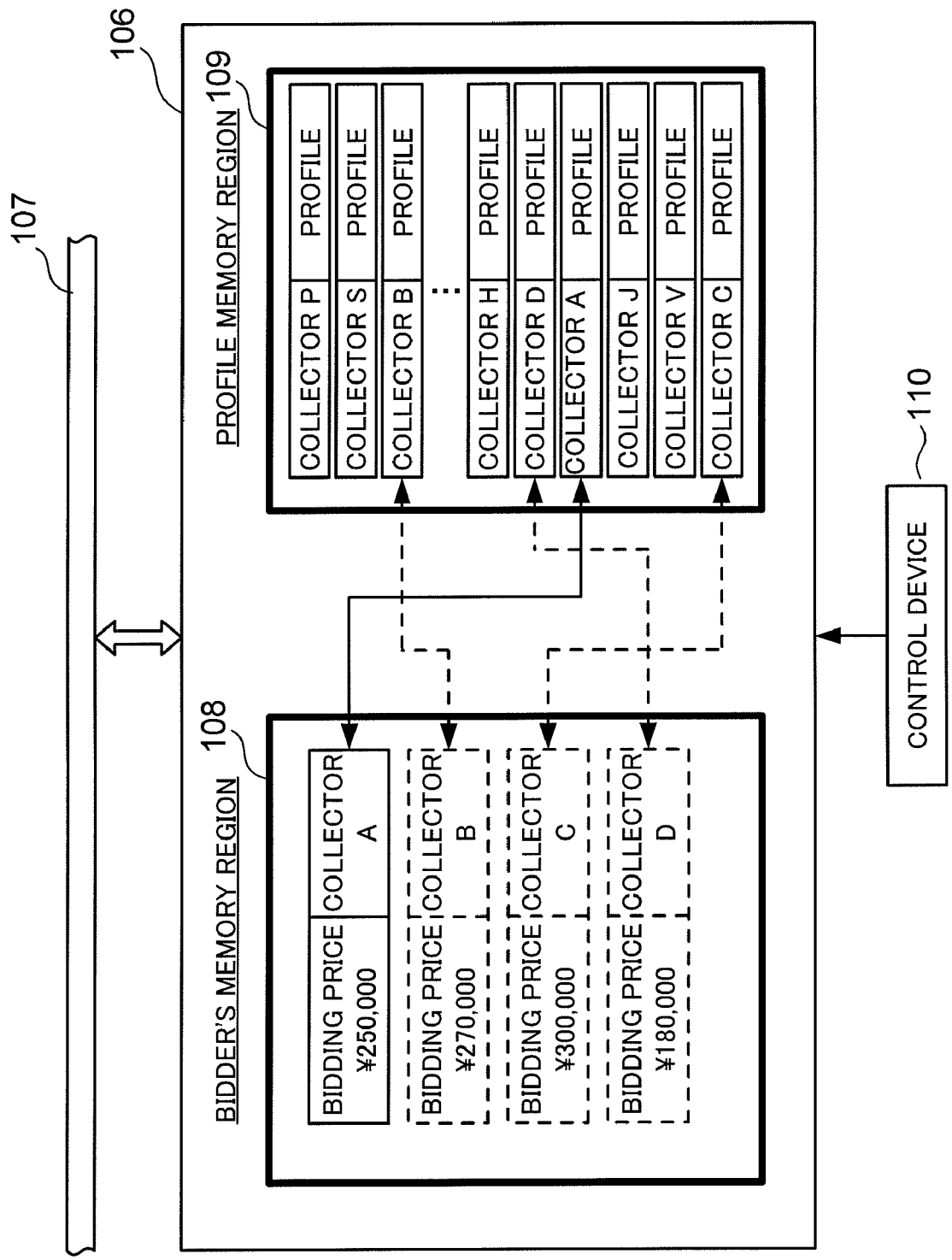
FIG. 11 is a view illustrating data stored in a storage unit of a server.

If the bidding data is sent within the bidding period, the bidding procedures of this embodiment as illustrated in FIG. 11 are performed (Step 4). The input bidding data of collector A is controlled by a control unit 110 of the server 102, passes through a bus line 107, and then is stored in a bidder memory region 108 of a storage device 106. Next, the control unit 110 searches the same collector's name in a registered profile memory region 109, to find profile data of collector A, and then sends bidding data of collector A to the artist terminal 101 with profile data of collector A (Step 5). Simultaneously, the control unit 110 also sends request information for selecting a winning bidder to the artist terminal 101.

When collector B offers his/her bid, also through the same process, bidding data of collector B is sent to the artist terminal 101 with profile data of collector B. This way, the artist terminal receives the bidding data of the collector and his/her profile together. Accordingly, there is an advantage such that it is possible to see the bidding data and the profile data on the same display screen of the artist terminal.

Since a reputation of past trades, social standing and the like about the bidder are also stated in the profile data, the artist decides a winning bidder considering the bid price information and the bidder's profile in the bidding data comprehensively.

For example, suppose that a bidding situation of the primary auction is as follows. That is, as illustrated in FIG. 11, collector A, a famous collector, offers a bidding price of ¥250,000. Collector B, an ordinary collector, offers a bidding price of ¥270,000. Collector C, a novice collector, offers a bidding price of ¥300,000. Collector D, an ordinary collector, offers a bidding price of ¥180,000.

At an ordinary auction, collector C who offers the best bid price becomes a winning bidder automatically. However, collector C does not always become a winning bidder under this system. The artist can select collector A, a famous collector, as a winning bidder in case that it is possible to expect that a resale price of the artwork would become high at the following secondary auction considering the collector's past auction achievements and his/her strong brand image described in his/her profile, or in case that it is possible to estimate that he/she can gain a better proceeds from a prompt resale transaction.

When collector A is selected as a winning bidder, the decision is sent from the artist terminal 101 to the server 102. The server 102 receives it and then conveys to collector A (Step 6).

When collector A is decided as a winning bidder, the sold artwork is delivered from the artist to collector A, and the collector pays the bid price to the artist as a consideration for the artwork. The artist pays a part of the consideration to the system administrator as a charge for using the system.

As described above, in the auction system according to this embodiment, an artist's artwork can be freely displayed and put up for auction and a reviewer can post his/her comments on the artwork freely in the system. Also, since the bidding for the artwork put up for auction is free, the trade of the artist's artwork is activated.

Further, the artist can expand the range of decision in selecting a winning bidder because the artist terminal receives not only bidding data including a bid price, but also a profile of the bidding collector. Also, since this auction system gives the artist authority to select a winning bidder, the artist can participate in a business of his/her artwork virtually. Consequently, a creative motivation of the artist can be enhanced further.

(5) The Second Embodiment of the Primary Auction

In the first embodiment of the primary auction, the server sends the collector's profile to the artist terminal with the bidding data of the collector. However, the server may send a reviewer's comments on the artwork and his/her profile in addition.

To make this possible, it is necessary to have a common code, in advance, which enables the user to search the artwork data, the reviewer's comment on the artwork, and the reviewer's profile. For example, a title data of an artwork is the common code for searching the artwork data and the reviewer's comment on the artwork. Also, a reviewer's name data is the common code for searching the reviewer's comment and the reviewer's profile.

(6) The First Embodiment of the Secondary Auction

Figure 12:
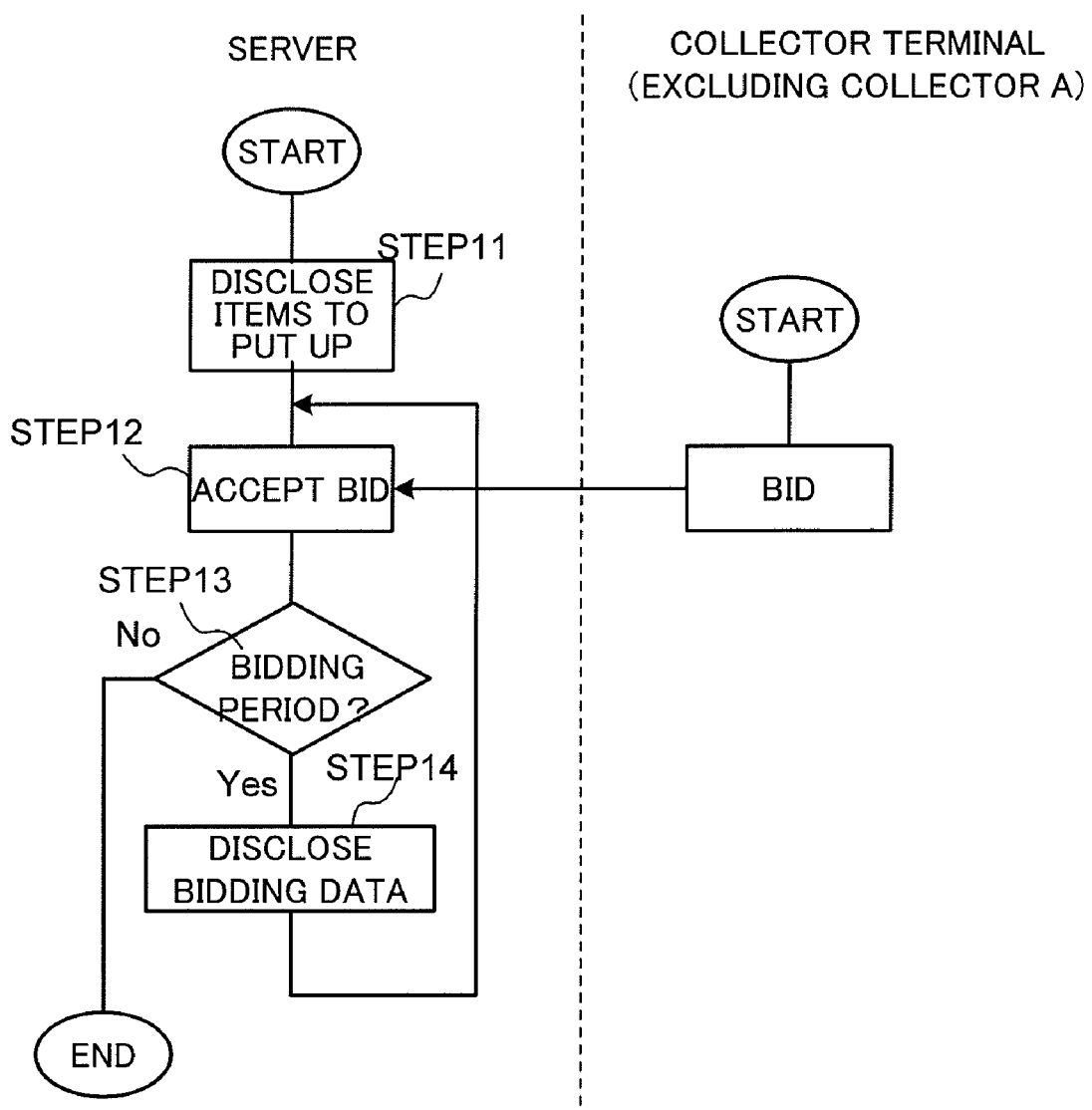
FIG. 12 is a view illustrating processing operation at a secondary auction.

FIG. 12 is a schematic diagram illustrating the embodiment of the secondary auction of the present invention, where a resale of artwork X is performed. Suppose that collector A, who became a winning bidder selected by an artist, puts artwork X he/she bought up for auction on this system to resell. Note that the secondary auction is open, and a bid price is disclosed.

As illustrated in FIG. 12, the secondary auction starts through the resale procedures where collector A inputs necessary information such as the information of artwork X, the price information, the exhibition information, the additional information and the like, from an electronic terminal of collector A. Then, the resale information of artwork X is released to other artists, reviewers, and collectors (Step 11). Participants in the artwork auction include collectors who unfortunately failed to win the bid at the primary auction, newly-arrived collectors and the like.

A bidding data of the collector sent from the collector terminal 103 is accepted at the server 102 (Step 12), and it is judged whether it was sent within the bidding period (Step 13).

When it is sent within the bidding period, the bidding data is released (Step 14). When a designated bidding period expires, the secondary auction is concluded.

At the secondary auction, the server searches the bidding data offering the best bid price among the bidding data received within the bidding period, and decides the collector who offered the bidding data as a winning bidder. Then, the server discloses the information.

For example, suppose that an ordinary collector E offers a bidding price of ¥400,000, a famous collector F offers a bidding price of ¥480,000, a novice collector G offers a bidding price of ¥600,000, and an ordinary collector H offers a bidding price of ¥800,000. In this case, the ordinary collector H becomes a winning bidder, because the person who offered the best bid price makes a successful bid automatically, regardless of the collector's name recognition and the brand image.

The bidder H receives artwork X from collector A, and pays the bid price to collector A as a consideration.

Under this system, it is established to give an artist a share of the successful bidding price. For example, when a share rate is set to be 10% of the successful bidding price, the winning bidder gives the artist ¥80,000 as the artist's share. Therefore, in this embodiment, the artist can receive ¥330,000 which is the sum of ¥250,000 as the proceeds from the sale at the primary auction and ¥80,000 as a share of the resale at the secondary auction. The artist can receive an artist's share of the resale price every time artwork X is resold at the secondary auction.

This way, the artist can receive his/her share of the resale price at the secondary auction in addition to the proceeds from the sale of the artwork at the primary auction. And, the creative motivation of the artist is expected to enhance because suitable proceeds are given back to the artist as the frequency of resale increases. Also, the auction business of artworks is activated because opportunities of the birth of an excellent artwork increase as the creative motivation of the artist enhances.

Further, all auctions after the second auction following the primary auction of the relevant artwork are referred to as the secondary auction. The share rate may be changed according to the frequency of the secondary auctions.

(7) The Second Embodiment of the Secondary Auction

The second embodiment of the secondary auction is to change the share rate at the next secondary auction based on the length of the period a bidder possesses an artwork.

Figure 13:
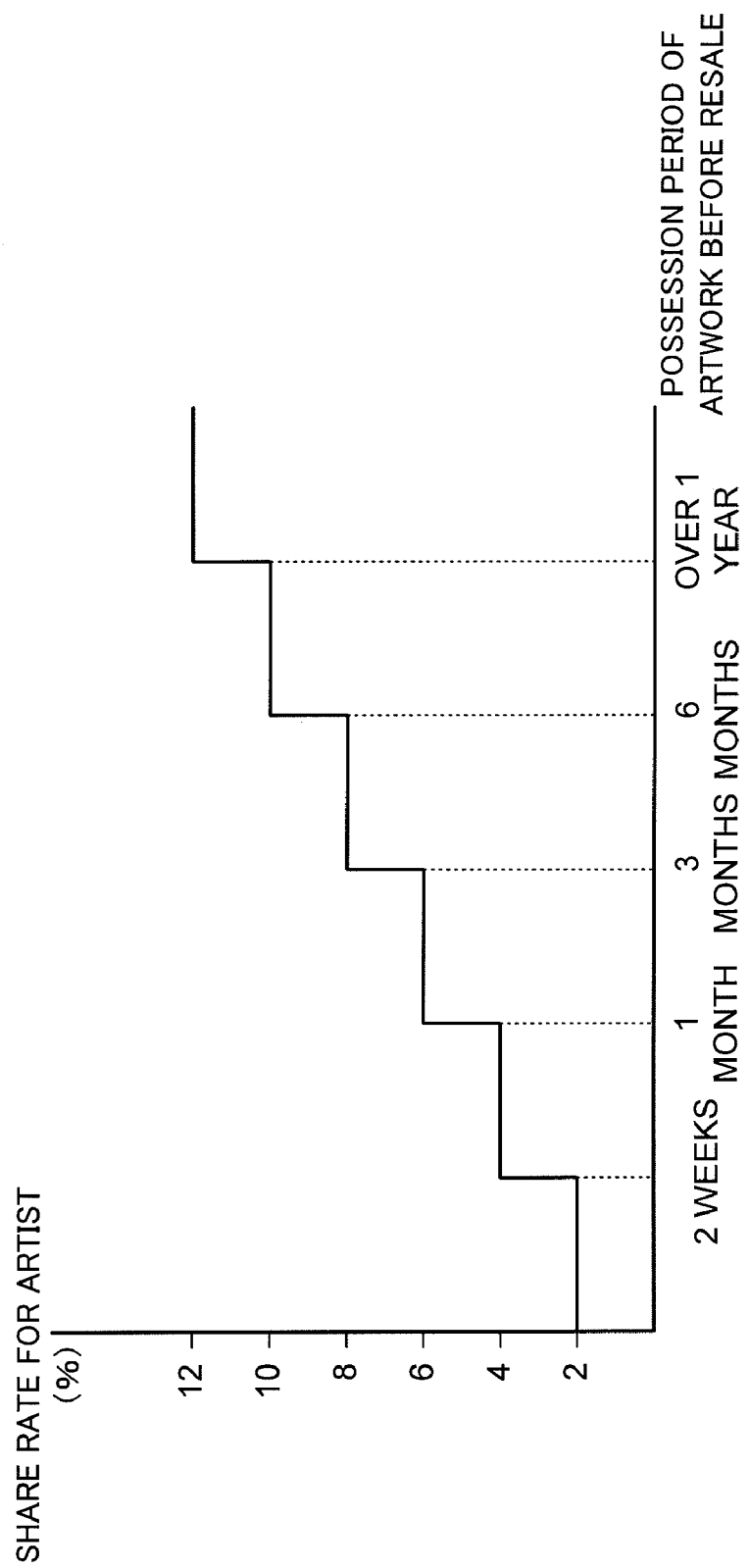
FIG. 13 is a view illustrating a relationship to adjust a share rate to an artist according to a length of a period of time when an artwork is possessed before a resale.

FIG. 13 is a view illustrating the relationship between the share rate and the length of the period a winning bidder possesses the artwork from the time the bidder won the bid to the time he/she begins the next resale procedures.

As illustrated in the figure, it is established that the share rate increases based on the length of the period the artwork is possessed as follows. That is, when the winning bidder possesses the artwork less than two weeks, the share rate is 2%; likewise, less than one month, 4%; less than three months, 6%; less than six months, 8%; less than a year, 10%; more than a year, 12%. This way, the longer the bidder possesses the artwork, the more the share rate rises. Thus, this system enables the shortening of the length of the period the winning bidder possesses the artwork, making it possible to activate a trade at the secondary auction.

(8) The Third Embodiment of the Secondary Auction

The third embodiment of the secondary auction is to change the share rate at the next secondary auction based on the proceeds from the trades at the primary auction and the secondary auction.

Figure 14:
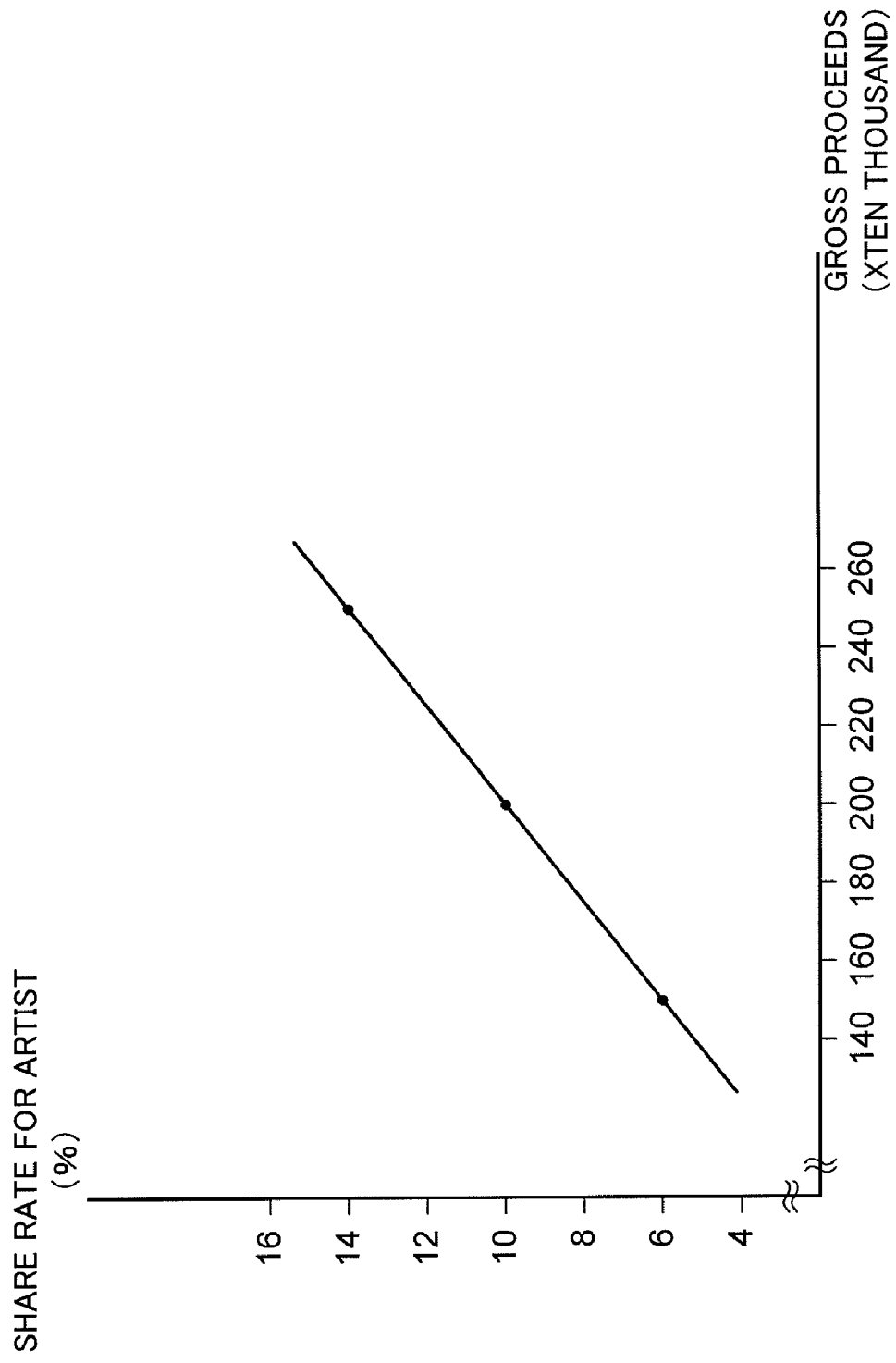
FIG. 14 is a view illustrating a relationship to adjust a share rate according to proceeds of an artwork trade.

FIG. 14 is a view illustrating the relationship between the share rate and the difference between gross proceeds the artist gained during a designated period and that during a period just before the designated period (the period before).

For example, according to FIG. 14, when an artist's gross proceeds in May is ¥2,000,000 and his/her gross proceeds in the next month, June, is ¥2,500,000, the increase of the proceeds is ¥500,000 making the share rate in July rise by 4%.

To make the description simple, FIG. 14 shows an example of the relationship that the share rate for the artist is in proportion to the difference between the proceeds. However, it does not always have to be proportional. The relationship has to be adjusted appropriately according to actual conditions.

This way, since an artist can gain a consideration corresponding to the rise of his/her artwork evaluation, he/she can enhance his/her creative motivation.

Meanwhile, since the profit of the winning bidder decreases as the share rate for the artist rises, the trade opportunities of the artist's artwork decreases in the market, making it possible to restrain a speculative trade due to unusual overheating of the artist's artwork valuation basis.

This way, under this system, it is possible to control market activation reasonably.

(9) The Fourth Embodiment of the Secondary Auction

The forth embodiment of the secondary auction is to use the difference between the total number of trades performed by an artist during the present period and that during a period just before the present period (the period before) to adjust the share rate for the artist for the next period.

Particularly, when combining the above described third embodiment and the forth embodiment, in other words, when adjusting the share rate for the artist according to the increase and decrease of the gross proceeds for the artist's artwork and the increase and decrease of the total number of trades, the market can be controlled more precisely in the context of the actual situation of the trade.

(10) Consideration to a Reviewer

It is also possible to give a certain amount of consideration to a reviewer, according to a successful bid price, evaluating the degree of his/her contribution to the market, when a collector succeeded the bid for an artwork with the help of the reviewer's comments on the artwork.

This way, if a reviewer is also given a consideration, he/she will make efforts to find an artwork of a talented artist earlier than any other reviewers. This promotes discovering of an artwork of an excellent artist, activating of the auction system, and enhancing of the quality of the auction system.

What is claimed is:

1. An artwork-trading computer system comprising:
a server which performs a primary auction and a secondary auction and sets respective bidding periods;
an artist terminal which sends visual data relating to an artwork of the artist to the server; and
a collector terminal which sends bidding data of the artwork to the server, wherein
in the primary auction, the art work is put up from the artist terminal, the artwork is bidden from the collector terminal, the server sends the artist terminal a signal for requesting to select a winning bidder among bidding collectors, and a consideration for the artwork successfully bidden is given to the artist, and
in the secondary auction, the art work is put up for resale from the collector terminal, the artwork is bidden from the other collector terminal, the server decides a winning bidder who offers a best bid price among bidding collectors, and a nonzero predetermined amount of a share of a resale price of the artwork successfully bidden is given to the artist every time the artwork is resold.

2. The artwork-trading computer system according to claim 1, wherein a consideration for artwork successfully bidden at the primary auction is given to the artist and a predetermined amount of a share of a resale price of artwork successfully bidden at the secondary auction is given to the artist.

3. The artwork-trading computer system according to claim 2, wherein the predetermined amount of the share is decided by multiplying the resale price by a predetermined share rate.

4. The artwork-trading computer system according to claim 3, wherein the share rate is adjusted by the difference between gross proceeds which the artist gains during a present period and gross proceeds which the artist gains during the period before.

5. The artwork-trading computer system according to claim 3, wherein the share rate is adjusted by the difference between the total number of trades performed by the artist during a present period and that during the period before.

6. The artwork-trading computer system according to claim 1, further comprising a reviewer terminal to provide comment data relevant to the artwork.

7. A nontransitory computer readable medium having stored thereon an artwork-trading program to process through an artist terminal, collector terminals and a server which are mutually connected by a network, comprising the steps that:
(a) the server receives visual data relating to an artwork of an artist sent from the artist terminal or from the collector terminal;
(b) the server releases the visual data relating to the artwork in the network;
(c) the server receives bidding data sent from the collector terminal for bidding the artwork;
(d) the server sets a predetermined bidding period to perform an auction for the artwork, wherein the auction corresponds to one auction selected from among a primary auction and a secondary auction;
(e) the server judges whether a bidding for the artwork sent from the collector terminal is for the primary auction which is performed for an artwork put up from the artist terminal for the first time, or for the secondary auction which is performed for an artwork put up from another collector terminal for resale; and
(f) the server requests the artist terminal to select a specific collector as a winning bidder among the bidding collectors when the server judges the bidding is for the primary auction, and the server selects the collector who offers the best bid price as the winning bidder when the server judges the bidding is for the secondary auction, and a nonzero predetermined amount of a share of a resale price of the artwork successfully bidden is given to the artist every time the artwork is resold.

8. The nontransitory computer readable medium having stored thereon the artwork-trading program according to claim 7, further comprising a step of multiplying the resale price by a predetermined share rate to give the artist a share in the resale price when the artwork is resold.

9. The nontransitory computer readable medium having stored thereon the artwork-trading program according to claim 8, further comprising a step of adjusting the share rate by the difference between gross proceeds which the artist gained during a present period and gross proceeds which the artist gained during the period before.

10. The nontransitory computer readable medium having stored thereon the artwork-trading program according to claim 8, further comprising a step of adjusting the share rate by the difference between the total number of trades performed by the artist during the present period and that during the period before.

11. An artwork-trading computer system comprising:
a server which performs a primary auction and a secondary auction and sets respective bidding periods;
an artist terminal which sends visual data relating to an artwork of an artist to the server; and
a collector terminal which sends bidding data of the artwork to the server, wherein
a collector marks the artwork, and the server stores and discloses information corresponding to the marking of the artwork, and the number of times the artwork is marked corresponds to an index of popularity, in the primary auction, the artwork is put up from the artist terminal, the artwork is bidden from the collector terminal, the server sends the artist terminal a signal for requesting to select a winning bidder among bidding collectors, and a consideration for the artwork successfully bidden is given to the artist, and in the secondary auction, the artwork is put up for resale from the collector terminal, the artwork is bidden from the other collector terminal, the server decides a winning bidder who offers a best bid price among bidding collectors, and a predetermined amount of a share of a resale price of the artwork successfully bidden is given to the artist every time the artwork is resold.

\* \* \* \* \*